United States Patent [19]

Smith

[11] 4,132,291
[45] Jan. 2, 1979

[54] THRUST PLATE FOR CALIPER-TYPE DISC BRAKES

[75] Inventor: Philip A. Smith, Troy, Ohio

[73] Assignee: The B. F. Goodrich Company, Akron, Ohio

[21] Appl. No.: 596,640

[22] Filed: Jul. 17, 1975

[51] Int. Cl.² ............................................. F16D 65/02
[52] U.S. Cl. .................... 188/73.6; 192/70.13
[58] Field of Search ...................... 188/73.6; 192/70.13

[56] References Cited

U.S. PATENT DOCUMENTS

| 2,921,650 | 1/1960 | Butler | 188/73.6 |
|---|---|---|---|
| 3,051,272 | 8/1962 | Burnett | 188/23.6 |
| 3,135,359 | 6/1964 | Davis | 188/73.6 |
| 3,310,135 | 3/1967 | Wells | 188/73.6 |
| 3,357,524 | 12/1967 | Smith | 188/73.6 |
| 3,695,398 | 10/1972 | Crawford | 188/73.6 |
| 3,885,650 | 5/1975 | Klaue | 188/73.6 |
| 3,893,546 | 7/1975 | Kestermeier et al. | 188/73.3 |

FOREIGN PATENT DOCUMENTS

| 1267560 | 5/1968 | Fed. Rep. of Germany | 188/73.6 |
|---|---|---|---|
| 2236420 | 2/1973 | Fed. Rep. of Germany | 188/73.6 |
| 697348 | 10/1965 | Italy | 188/73.6 |

Primary Examiner—George E. A. Halvosa
Attorney, Agent, or Firm—Harry F. Pepper, Jr.

[57] ABSTRACT

A caliper type disc brake has friction lining carriers which are retained by thrust plates. Each thrust plate is secured to the caliper housing by a pivot bolt and at least one cap screw. When the cap screw or screws of a thrust plate are removed, that thrust plate can be rotated about its associated pivot bolt, thereby permitting removal and replacement of its associated friction lining carrier or carriers without complete disconnection of the thrust plate from the caliper. The thrust plate can then be rotated back into position and resecured by cap screw or screws.

10 Claims, 3 Drawing Figures

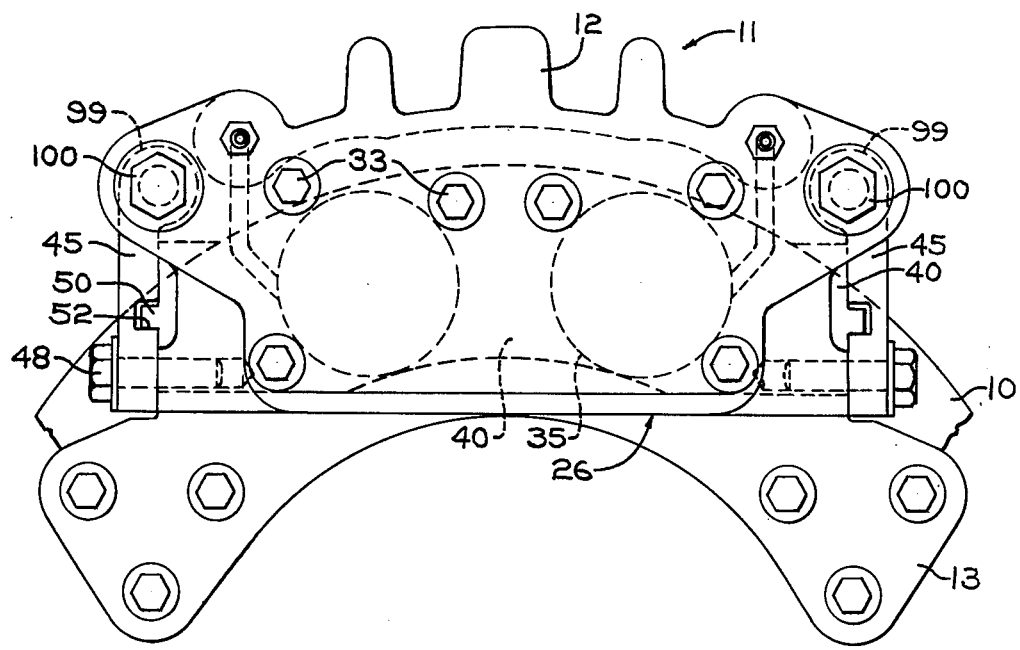
Fig. 1
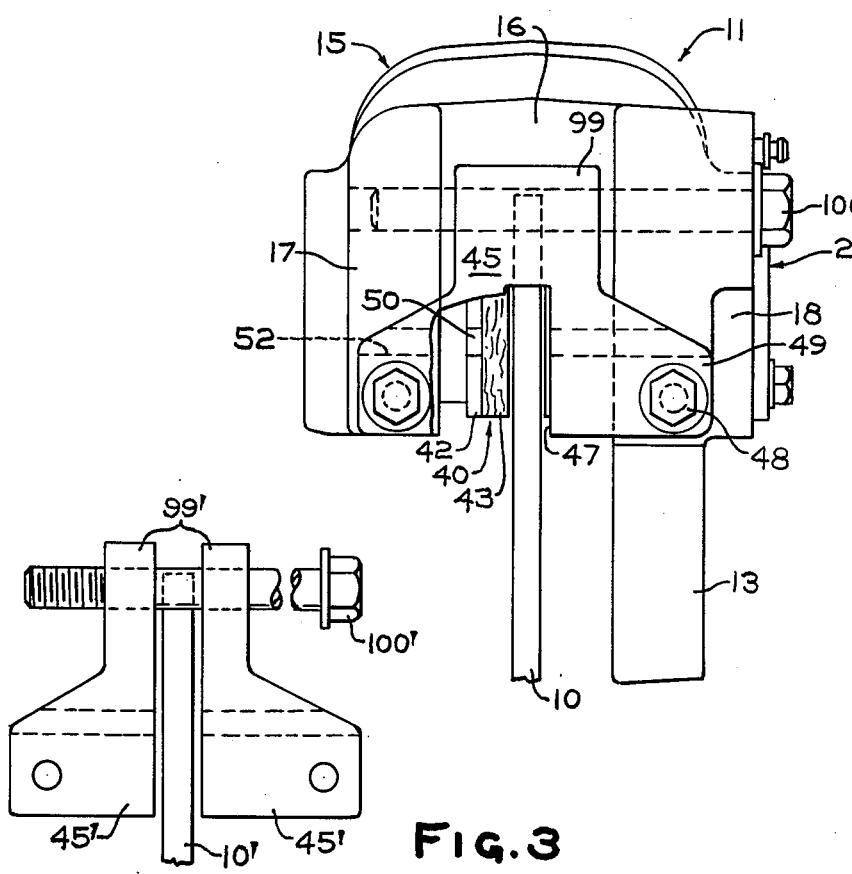
Fig. 2
Fig. 3

THRUST PLATE FOR CALIPER-TYPE DISC BRAKES

BACKGROUND OF THE INVENTION

This invention relates to disc brakes and more particularly to caliper or "spot" type disc brakes.

A typical caliper or "spot" type disc brake generally comprises a rotatable brake disc and a nonrotatable caliper having legs that straddle the brake disc. A friction lining carrier having an arcuate friction lining or facing secured thereto is usually nonrotatably mounted adjacent to each leg of the caliper and is capable of being pressed into contact with the rotatable brake disc. The surface of the friction linings are of a much smaller area than the area of the associated friction surface of the rotatable brake disc. The friction linings are usually designed to be replaced after they have become worn.

Some caliper type brake designs require complete removal of the caliper assembly from its associated wheel for replacement of the friction linings. More recent brake designs have been aimed at providing means to remove and replace worn friction linings quickly and conveniently without disassembling the brake housing or other parts of the brake assembly. One of the latter type of brake designs is disclosed in U.S. Pat. No. 3,357,524, assigned to the assignee of the present invention.

The brake assembly disclosed in U.S. Pat. No. 3,357,524 has end or "thrust" plates connected to a caliper housing to restrain movement of the friction lining carriers in all directions except the direction in which the friction lining is pressed toward the rotatable brake disc. The thrust plates transmit the braking torque from the rotatable disc to the nonrotatable housing. As a further feature of the brake disclosed in U.S. Pat. No. 3,357,524, each lining carrier is fully supported at each end by a thrust plate.

To remove a friction lining carrier from the type of caliper disc brake disclosed in U.S. Pat. No. 3,357,524, it is merely necessary to remove a thrust plate from one end of the housing. The carrier can then be removed by sliding it from between the housing and the rotatable brake disc through the opening created by the removed thrust plate in a direction parallel to the friction surface of the rotatable brake disc. This is easily accomplished without removing or disassembling the housing itself or the brake actuation mechanism.

Although designs such as U.S. Pat. No. 3,357,524 have greatly improved the serviceability of caliper type disc brakes, further improvements are still possible. For example, the procedure of removing a thrust plate may be simplified by eliminating the removal of numerous screws or other fasteners. Furthermore, a removable thrust plate can be misplaced, and is often difficult to arcuately reposition when being replaced.

SUMMARY OF THE INVENTION

It is an object of the present invention to provide a caliper type disc brake with thrust plates having friction lining carriers that are accessible without completely disconnecting the thrust plates from the brake housing.

It is a further object of the present invention to provide a caliper type disc brake having friction lining carriers that are accessible by pivoting a thrust plate.

It is a further object of the present invention to provide a caliper type disc brake having pivotable thrust plates which provide access to the friction lining carriers.

These and other objects of the present invention which will become evident by the following detailed description are achieved by a caliper type disc brake assembly with friction lining carriers being retained by pivotable thrust plates. Each thrust plate is retained by a pivot bolt and one or more cap screws. When the cap screws are removed the thrust plate is free to rotate about its associated pivot bolt thereby allowing access to at least one friction lining carrier without complete disconnection of the thrust plate.

BRIEF DESCRIPTION OF THE DRAWINGS

FIG. 1 is a fragmented side elevation of a caliper type disc brake assembly according to the present invention;

FIG. 2 is a fragmented end elevation of the disc brake assembly of FIG. 1; and

FIG. 3 is an end elevation of an alternative embodiment of the thrust plate of the present invention.

DETAILED DESCRIPTION OF A PRESENTLY PREFERRED EMBODIMENT

Referring to FIGS. 1 and 2 a caliper type disc brake assembly 11 comprises a caliper 12 which is rigidly fastened to a nonrotatable torque plate 13. The torque plate 13 is rigidly fastened to a nonrotatable portion of a wheel (not shown), thereby preventing rotation of the caliper 12. The brake assembly 11 further comprises a flat rigid annular disc 10 which is rigidly fastened to a rotatable portion of the wheel (not shown). The brake disc 10 is disposed partially within the caliper 12 and is rotatable relative thereto about a suitable axis (not shown).

The caliper 12 includes a rigid caliper housing 15 which in cross section is "U" shaped. In its lengthwise direction the caliper housing 15 is arcuately curved approximately concentric with the brake disc. The housing 15 includes an outer body piece 16 and two side pieces 17 and 18, each side piece being integral with the outer body piece 16. The side pieces 17 and 18 of the housing flank opposite sides of the disc 10 and cooperate to retain a typical brake actuation mechanism, shown generally as 26.

The brake actuation mechanism 26 is fastened by cap screws 33 to the outside surface of the side pieces 17 and 18 of the caliper housing 15. Through each side piece 17 and 18 there are two holes 35 through which components of the brake actuation mechanism reciprocate in the operation of the brake.

There is a friction member 40 flanking each side of the rotatable brake disc 10 and located between a side piece 17 or 18 and the disc 10. Each friction member 40 is arcuately shaped of approximately the same curvature as the portion of the brake disc 10 which it engages and includes a rigid lining carrier 42 to which a friction lining 43 is fastened. The friction lining 43 may be composed of any of the types of abrasive lining material which are known in the art such as, for example, the organic or metallic friction material. Suitable fastening means such as adhesives or other forms of fasteners (not shown) may be used to secure the friction lining 43 to its associated lining carrier 42.

The two friction members 40 are supported inside the brake housing by thrust plates 45. Referring to FIG. 2, in one preferred embodiment the thrust plates 45 bridge between the end edges of the housing side pieces 17 and 18 in a direction transverse to the brake disc 10. The thrust plates 45 of FIG. 2 are generally rectangular except for a medial slot 47 through which the brake disc 10 extends, and cap screw flanges 49 through which cap screws 48 pass.

A portion of each thrust plate 45 is disposed radially outwardly from its associated brake disc 10. The thrust plate 45 has a hinge member 99 through which a pivot bolt 100 extends. The pivot bolt 100 also extends through the outer body piece 16 and through the thrust plate 45 in a direction parallel to the axis of rotation of the brake disc 10, thereby pivotally connecting each thrust plate 45 to the brake housing. Each thrust plate 45 of FIG. 2 is further secured to the brake housing 15 by two cap screws 48 which are threaded into the end edges of the side pieces 17 and 18. There may be, of course, situations where a different number of cap screws 48 are required for optimum performance.

In another preferred embodiment of the invention depicted in FIG. 3, two thrust plates 45' are attached to each end of a caliper such as 12, one associated with each friction member such as 40, thereby permitting separate access to each friction member. In this embodiment a brake disc 10' extends between the two thrust plates 45'. Each thrust plate 45' has a hinge member 99' through which a pivot bolt 100' passes. The pivot bolt 100' also passes through a portion of a caliper housing such as 15, thereby pivotally securing each thrust plate 45' to the housing.

Referring again to FIG. 2, the friction members 40 extend arcuately through the caliper housing 15 from one thrust plate 45 to a thrust plate 45 on the opposite end of the housing 15. Each friction member 40 has a projecting lug 50 on each of its ends which fits into a corresponding slot 52 in the inwardly directed face of each thrust plate 45. In this manner the thrust plates 45 provide the sole support inside the brake housing 15 for the friction member 40, the interlocking lugs 50 and slots 52 restraining movement of the friction members 40 in any direction except the direction in which they are pressed toward the brake disc 10. Alternatively, each thrust plate can have a projecting lug which fits into a slot in each end of the friction members. Another alternative is to widen the slot 52 to accept the entire end height of the friction member, thereby eliminating the need for a projecting lug such as 50.

Regardless of which alternative method of friction member support is chosen, when a friction member 40 is frictionally engaged with the brake disc 10, one thrust plate 45 resists the braking torque imposed on the braking assembly 12 by rotating brake disc 10. This thrust plate 45 transmits the torque in turn to the brake housing 15 and eventually to the frame on which the housing is mounted (not shown).

After extended use of the brake, it may become necessary to replace or inspect the friction linings 43 which are bonded to their associated friction lining carriers 42. To remove a friction member 40, the cap screw or screws 48 of one thrust plate 45 are removed, thereby leaving the end plate 45 free to rotate on its associated pivot bolt 100. The thrust plate 45 can then be pivoted upwardly allowing access to one or more friction members 40. A friction member 40 may then be withdrawn from between the brake disc 10 and the adjoining side piece, 17 or 18, of the housing 15 by moving it in a direction parallel to the braking surface of disc 10.

A new friction member 40 can be inserted according to the reverse procedure. The thrust plate 45 is then rotated back into its operating position. The interlocking lugs 50 of the lining carriers 42 and the corresponding slots 52 of the thrust plates 45 at both ends of the caliper housing 15 must be properly engaged before the thrust plate 45 can be secured by cap screws 48. Proper engagement of the thrust plate 45 and carrier 42 is simplified by the pivot bolt 100 which retains cap screw flanges 49 of the thrust plate 45 in proper alignment with the cap screw holes in side pieces 17 and/or 18.

Although the foregoing structure was described for the purpose of illustrating a presently preferred embodiment of the invention, it should be understood that many modifications or alterations may be made without departing from the spirit and the scope of the invention as set forth in the appended claims.

I claim:

1. In a caliper type disc brake assembly comprising a nonrotatable caliper housing, a thrust plate, means to secure the thrust plate to an end of the housing, a friction member adapted to be retained within the housing by the thrust plate, and a brake disc extending into the housing and rotatable about an axis, the improvement wherein the means to secure the thrust plate to the housing comprises a pivot bolt extending in a direction substantially parallel to the axis of rotation of the brake disc, the thrust plate being pivotally attached to the pivot bolt, whereby the thrust plate can be rotated about the pivot bolt thereby allowing access to the friction member.

2. The improvement as defined in claim 1 wherein the means to secure the thrust plate to the housing further comprises at least one cap screw.

3. The improvement as defined in claim 1 wherein a portion of the thrust plate is disposed radially outwardly of the brake disc and the pivot bolt engages the thrust plate at the radially outward portion.

4. The improvement as defined in claim 1 wherein a second thrust plate is secured to another end of the housing by means comprising a second pivot bolt, whereby the second thrust plate can be rotated about the second pivot bolt thereby allowing access to the friction member.

5. The improvement as described in claim 4 wherein the second pivot bolt extends in a direction parallel to the axis of rotation of the brake disc.

6. The improvement as defined in claim 4 wherein the means to secure the second thrust plate to the housing further comprises at least one cap screw.

7. The improvement as defined in claim 4 wherein a portion of the second thrust plate is disposed radially outwardly of the brake disc and the second pivot bolt engages the second thrust plate at the radially outward portion.

8. The improvement as defined in claim 1 wherein a second thrust plate is secured to the end of the housing by second means comprising the pivot bolt, whereby the second thrust plate can be independently rotated about the pivot bolt thereby allowing access to a friction member.

9. The improvement as defined in claim 8 wherein the second means to secure the second thrust plate to the housing further comprises at least one cap screw.

10. A spot-type disc brake comprising a disc, a caliper straddling part of the disc's periphery, a pad on each side of the disc within the caliper, means within the caliper for urging the two pads to engage the disc, the caliper having an opening for the insertion of each pad so disposed at an end of the caliper that the pad is inserted and withdrawn in a peripheral direction, a closure member having two limbs immovable relative to each other and pivotal about an axis parallel to the rotational axis of the disc between a first position wherein each limb blocks a respective opening to prevent peripheral movement of a respective pad and a second position allowing insertion and withdrawal of the pads, and a locking means engageable with one of the limbs to secure both limbs in the first position.

* * * * *